United States Patent [19]

Wada

[11] 4,406,192
[45] Sep. 27, 1983

[54] APPARATUS FOR MACHINING A PLANAR SIDE FACE OF A PISTON RING

[75] Inventor: Masahiko Wada, Kashiwazaki, Japan

[73] Assignee: Kabushiki Kaisha Riken, Tokyo, Japan

[21] Appl. No.: 259,471

[22] Filed: May 1, 1981

[30] Foreign Application Priority Data

May 2, 1980 [JP] Japan ................................ 55-61068

[51] Int. Cl.³ ............................................ B23B 19/00
[52] U.S. Cl. ...................................... 82/19; 29/27 B; 82/2 R; 82/2.5; 82/2.7; 408/54
[58] Field of Search ..................... 82/2 R, 2.5, 2.7, 19, 82/18, 11, 1.2, DIG. 3; 408/54; 29/27 B

[56] References Cited

U.S. PATENT DOCUMENTS

| | | | |
|---|---|---|---|
| 2,377,960 | 6/1945 | Phillips | 29/27 B |
| 2,566,304 | 9/1951 | Bates | 29/27 B |
| 3,165,011 | 1/1965 | Kelly | 408/54 |
| 3,630,631 | 12/1971 | Becker | 82/2 R |
| 3,731,562 | 5/1973 | Heuser | 82/1.2 |
| 3,756,099 | 9/1973 | Sullivan | 82/2.7 |

Primary Examiner—Francis S. Husar
Assistant Examiner—Jerry Kearns
Attorney, Agent, or Firm—Finnegan, Henderson, Farabow, Garrett & Dunner

[57] ABSTRACT

Apparatus for machining the planar side face of a piston ring having a cutting tool holder reciprocable with respect to the planar side faces of the piston rings in the axial direction thereof. A cutting tool is secured to the cutting tool holder so that it cuts the side face of the piston ring from the axial direction to reduce the amount of cutting depth of the undercut portion on the ring.

4 Claims, 5 Drawing Figures

APPARATUS FOR MACHINING A PLANAR SIDE FACE OF A PISTON RING

The present invention relates to an apparatus for machining a planar side face of a piston ring, and more particularly to an apparatus for providing an under-cut portion on a planar side face of a piston ring by reciprocating a cutter means in the axial direction of the piston ring.

Piston rings are used in internal combustion engines, for example, for automobiles and placed in grooves on pistons so as to be urged toward the cylinder walls of the internal combustion engines. The conventional piston ring has a gap where two confronting end faces of the split ring may likely come together. For the purpose of improving the sealing effect and the oil scraping function of the piston ring, the piston ring is further provided with an under-cut portion formed on one of the parallel planar side faces thereof that opens radially outwardly. The under-cut portion extends circumferentially around the ring and terminates contiguous to the confronting end faces of the split ring.

As illustrated in FIGS. 1 and 2, a prior method of making an under-cut portion or shoulder on one side face of a piston ring comprises the steps of moving a piston ring (2) toward a rotating milling cutter (1) as indicated by an arrow A, rotating the piston ring (2) to cut the side face thereof with the milling cutter (1) as indicated by an arrow C and to form an under-cut portion (3) thereon, and returning the piston ring (2) to the original position as indicated by an arrow B. In general, the under-cut portion (3) has a depth of $l_1$ and a width of $l_2$ which is greater than the depth of $l_1$. In this method, the rotating milling cutter (1) first contacts an exterior surface of the piston ring (2) and in turn cuts into it due to the radial movement of the piston ring (2) with respect to the milling cutter (1) until the predetermined width of $l_2$ may be obtained. However since the width of $l_2$ is large, the continuous cutting operation of the milling cutter (1) is great and the life span thereof may be shortened.

Accordingly, it is a primary object of the present invention to provide an apparatus for machining a planar side face of a piston ring from the axial direction thereof to form an under-cut portion thereon.

Another object of the present invention is to provide an apparatus for machining a planar side face of the piston ring, which includes a cam mechanism to perform the cutting of the side face of the piston ring with a cutting tool.

The novel features and the advantages of the present invention will be understood more fully from the following description of embodiments thereof with reference to the accompanying drawings in which.

Figure 3:
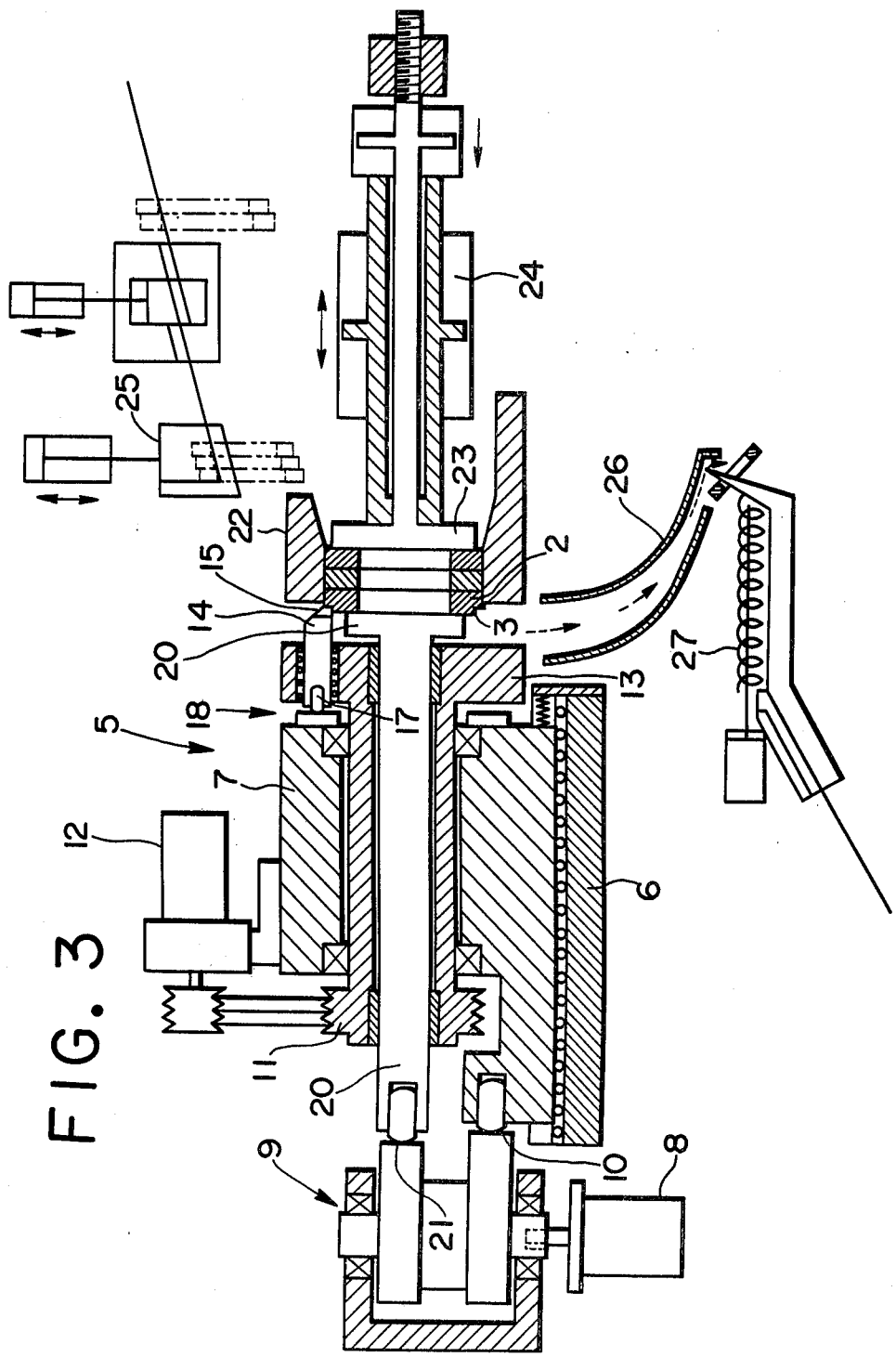
FIG. 3 is a sectional view showing one embodiment of the present invention to form an under-cut portion on the side face of a piston ring.

Referring now to FIG. 3, there is shown an apparatus (5) for machining the planar side surface of a piston ring (2) to form an under-cut portion or shoulder (3) thereon which includes a headstock (7) slidable with respect to a stationary base member (6) and a main shaft (11) rotatably fitted in a bore of the headstock (7) so that the rear and front portions of the shaft extend beyond the headstock (7). One end surface of the headstock (7) is in direct contact and cooperates with a cam surface (10) of a first cam means (9) so that operation of the first cam means (9) by actuation of a motor (8) is capable of reciprocating the headstock (7) along the stationary base (6). The main shaft (11) is rotated upon actuation of a motor (12) and has an annular portion (13) supporting a cutting tool holder (14) through a suitable bearing means.

Figure 4:
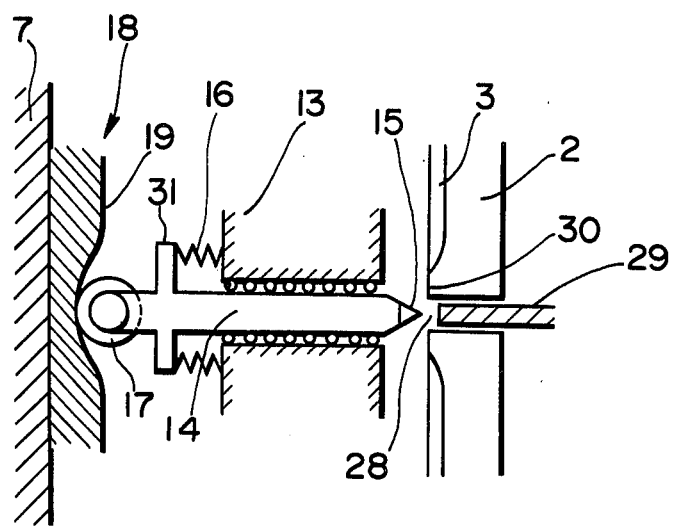
FIG. 4 is a cross-sectional view showing in more detail a cutting tool holder used in the apparatus shown in FIG. 3.

As best shown in FIG. 4, the cutting tool holder (14) is provided with an annular flange (31) and at one end with a roller (17). A spring (16) is disposed between a side surface of the annular portion (13) of the main shaft (11) and the annular flange (31), thereby permitting the cutting tool holder (14) to be urged in a direction away from the piston ring (2) to be machined. The roller (17) is rotatably supported on the cutting tool holder (14) and is in direct contact with the cam surface (19) of a second cam means (18), because of the biasing force of the spring (16). The second cam means (18) is rigidly fixed to a side surface of the headstock (7). Thus, the cutting tool holder (14) can be axially reciprocated according to the configuration of the cam surface (19) upon rotation of the main shaft (11). The cutting tool holder (14) is provided at the other end with a cutting tool (15).

In order to hold the piston ring (2) to be worked, an axially movable rod (20) which runs through a central bore of the main shaft (11) is used in this apparatus. The rod (20) cooperates at one end with a cam surface (21) of the first cam means (9) and at the other end with the piston ring (2).

A hollow ring holder (22) is arranged opposite to the annular portion (13) of the main shaft (11) in spaced relationship therewith, in which a plurality of the piston rings (2) are housed. These rings (2), housed in the ring holder (22), are interposed between the rod (20) and a pushing rod (23) which is axially movable by actuation of a cylinder device (24).

The piston rings (2) intended to have an under-cut portion (3) thereon are transferred from a ring feeder (25) into the ring holder (22) and the piston rings (2) which have been subjected to the cutting work are dropped by gravity therefrom through a ring chute (26) to a ring retainer (27).

As shown in FIG. 3, the axis of the piston rings (2) in the ring holder (22) is aligned with the axis of the main shaft (11). Preferably, the ring holder (22) is provided along its inner surface with a guide (29) (see FIG. 4), so that the piston rings (2) are aligned along and guided by the guide (29) by placing the guide (29) in the gap (28) between the confronting end surfaces of the split rings.

As is apparent from the above, the cutting tool (15) secured to the tool holder (14) has access to the planar side surface of the piston ring from the axial direction thereof. When the main shaft (11) is rotated and the cutting tool (15) is advanced owing to the second cam means (18), the planar side face of the piston ring (2) is machined with the cutting tool (15) to form the undercut portion (3) thereon and to form lands (30) near the gap (28) defined by the confronting end faces of the split ring. The lands (30) are formed by moving the cutting tool (15) leftward as viewed in FIG. 4 or away from the rings due to the appropriate profile of cam surface (19) of the second cam means (18).

Figure 5:
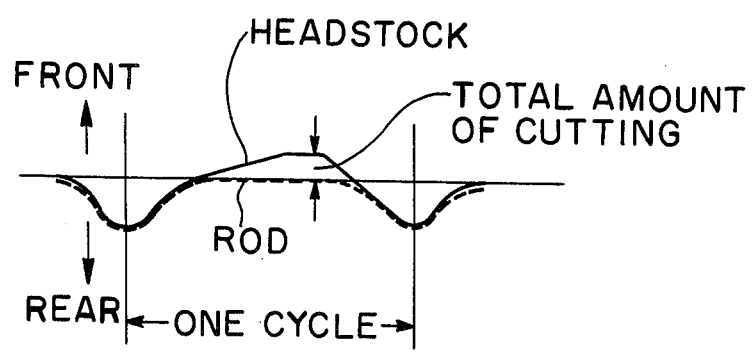
FIG. 5 is a graphical representation of the operation of cam mechanism used in the apparatus shown in FIG. 3.

The operation of the apparatus (5) is explained hereinafter. The piston rings (2) fed from the feeder (25) to the ring holder (22) are interposed between the rod (20) and the push rod (23) and held in the ring holder (22) by actuation of the cylinder means (24). The guide (29) projecting from the inner wall of the ring holder (22) into the gap (28) of the piston rings (2) to be worked keeps the piston rings (2) in a predetermined position in the ring holder (22) relative to tool (15). The motor (12) is then actuated to rotate the main shaft (11). The rotation of the main shaft (11) causes the cutting tool holder (14) to move back and forth in an axial direction according to the profile of the cam surface (19) of the second cam means (18). On the other hand, when the motor (8) is actuated, the headstock (7) and the rod (20) are axially reciprocated by rotation of the first cam means (9). The cycle of the headstock (7) and the rod (20) is illustrated in FIG. 5. When the headstock (7) is advanced along the base member (6) toward the piston ring (2) held in the ring holder (22) together with the cutting tool holder (14), the planar side face of the piston ring (2) is cut with the cutting tool (15) to form the under-cut portion (3) thereon. The land (30) is left on the planar side face of the piston ring (2) because the cutting tool (15) is retracted to a position where it is in noncontact with the piston ring (2) owing to the second cam means (19).

Figure 1:
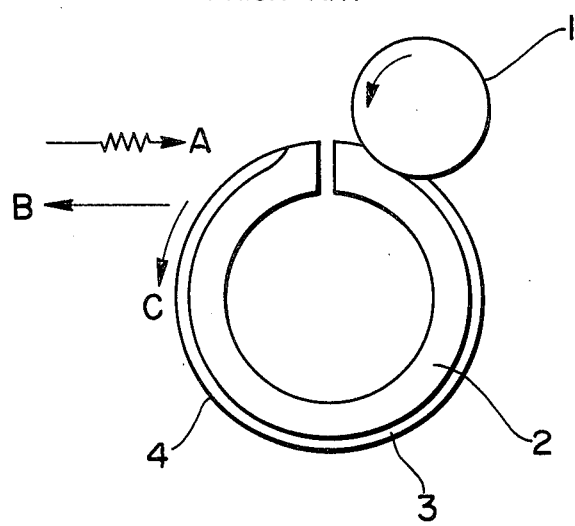
FIG. 1 is a diagramatic illustration of a prior apparatus for forming an under-cut portion on a side face of a piston ring.
Figure 2:
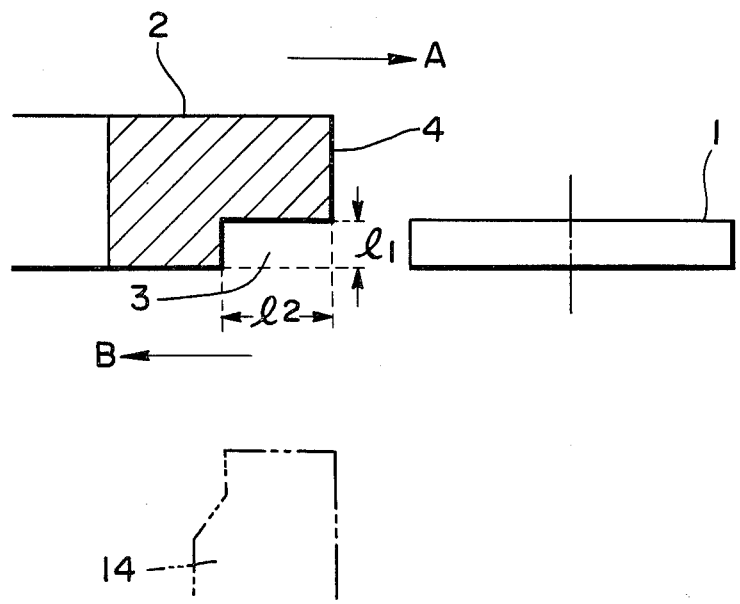
FIG. 2 is a diagramatic segment of the prior apparatus as shown in FIG. 1.

The cutting tool (15) has access to the planar side face of the piston ring (2) from the axial direction thereof and forms the under-cut portion (3) thereon having the depth of $l_1$. The machining amount of depth of $l_1$ is less than that of $l_2$ (see FIG. 2). Accordingly, the cutting operation can be efficiently performed. After forming the under-cut portion (3) and the land (30) on the piston ring (2), the headstock (7) moves backward due to the operation of the first cam means (9) and the piston ring (2) having the under-cut portion (3) and the lands (30) drops down through the chute (26) to the ring retainer (27) by the advance of the push rod (23) due to actuation of the cylinder means (24). The next piston ring (2) to be worked is moved to the working position and held in place by the rod (20) and the push rod (23).

Thus according to the present invention, the cutting tool is moved toward the piston ring from the axial direction thereof by the cam means so that the undercut process to the piston ring can be easily performed and the advance amount of the cutting tool is decreased.

It is to be understood that the present invention is, by no way, limited to the particular embodiment described and shown in the drawings but also comprises any modifications within the scope of the appended claims.

I claim:

1. Apparatus for machining a shoulder on the planar side face of a split piston ring comprising a base, a headstock slidably mounted on the base, a main shaft rotatably supported in said headstock, a cutting tool holder mounted on the main shaft for axial movement relative to the shaft and having a cutting tool at one end, a first cam means for reciprocating said headstock on the base in the axial direction of the shaft, a second cam means for axially reciprocating said cutting tool holder upon rotation of the shaft, a piston ring holder located opposite the cutting tool, and means for holding piston rings in the ring holder so that the axis of the rings is aligned with the axis of the shaft and a planar side face of the rings is exposed to the tool, means for feeding piston rings into and for discharging machined piston rings from the ring holder, wherein said first cam means advances the headstock, shaft, and cutting tool to a position adjacent the piston ring to be machined and withdraws them after machining and the second cam means moves the cutting tool in an axial direction between a cutting position and a non-cutting position during rotation of the shaft to form a shoulder on at least a portion of the exposed planar side face of a piston ring in the ring holder.

2. The apparatus of claim 1, in which the main shaft is mounted in a center bore of the headstock and has an enlarged portion located outside said headstock adjacent the ring holder which portion mounts said cutting tool holder, and the second cam means comprises a cam surface fixed to the headstock, a follower rotatably secured to said cutting tool holder and a spring urging the follower toward said cam surface whereby rotation of the shaft moves the tool holder and tool in an axial direction between said positions according to the profile of the cam surface.

3. The apparatus of claim 2, in which said ring holder comprises a rod extending through the shaft of the headstock, a pushing rod co-axially located opposite from said rod whereby the ring to be machined is held between them, said first cam means having first and second cam surfaces, means for rotating the cam surfaces, a first follower secured to said headstock that cooperates with said first cam surface and a second follower secured to said rod that cooperates with said second cam surface, whereby rotation of the first cam means advances and withdraws the headstock and moves the rod back and forth between a holding and non-holding position with respect to the ring to be machined according to the profile of the first and second cam surfaces, respectively.

4. The apparatus of claim 2, in which the cam surface of said second cam means draws the cutting tool away from the ring near the gap defined by the confronting end faces of the split ring to form lands on the shoulders near the gap.

* * * * *